United States Patent
Chuang et al.

(10) Patent No.: US 8,417,977 B2
(45) Date of Patent: *Apr. 9, 2013

(54) OPERATING METHOD FOR INTEGRATED INTERFACE OF PDA AND WIRELESS COMMUNICATION SYSTEM

(75) Inventors: Hsun-Hsin Chuang, Tauyuan Hsien (TW); Hsi-Cheng Yeh, Taoyuan (TW); Chih-Chao Hsieh, Taipei Hsien (TW); Shi-Je Lin, Taipei (TW); Wen-Hsing Lin, Taipei (TW)

(73) Assignee: HTC Corporation, Taoyuan County (TW)

( * ) Notice: Subject to any disclaimer, the term of this patent is extended or adjusted under 35 U.S.C. 154(b) by 187 days.

This patent is subject to a terminal disclaimer.

(21) Appl. No.: 12/788,326

(22) Filed: May 27, 2010

(65) Prior Publication Data

US 2010/0240412 A1    Sep. 23, 2010

Related U.S. Application Data

(63) Continuation of application No. 11/844,349, filed on Aug. 23, 2007, now Pat. No. 7,765,414, which is a continuation of application No. 10/249,403, filed on Apr. 7, 2003, now Pat. No. 7,278,032.

(30) Foreign Application Priority Data

Aug. 15, 2002  (TW) ............................... 91118369 A (51) Int. Cl.
*G06F 1/00*     (2006.01)
*G06F 1/26*     (2006.01)
*G06F 1/32*     (2006.01)
*G06F 13/00*    (2006.01)

(52) U.S. Cl.
USPC ............ 713/320; 713/300; 713/323; 710/100

(58) Field of Classification Search .................. None
See application file for complete search history.

(56) References Cited

U.S. PATENT DOCUMENTS

| 5,115,182 A | 5/1992 | Ehmke et al. |
| 5,303,395 A | 4/1994 | Dayani |

(Continued)

FOREIGN PATENT DOCUMENTS

| CN | 1200855 | 12/1998 |
| CN | 1332566 | 1/2002 |

(Continued)

OTHER PUBLICATIONS

"Summons to attend oral proceedings pursuant to Rule 115(1) EPC of European Counterpart Application No. 02 025 339.9", issued on Mar. 3, 2011, p. 1-p. 8.

(Continued)

*Primary Examiner* — Ji H Bae
(74) *Attorney, Agent, or Firm* — Jianq Chyun IP Office (57) ABSTRACT

An operating method for an integrated interface of a PDA and a wireless communication system includes the following steps. Firstly, when the wireless communication system starts to operate from a standby mode, a state signal is transmitted from the wireless communication system to the PDA. Then, if the PDA receives the state signal when the PDA is in a sleep state, the PDA is wakened and an input source of an audio element inside the PDA is switched to the wireless communication system. An electromagnetic wave signal is received by a wireless communication element and converted into audio data. Afterwards, the audio data is transmitted from the wireless communication system to the PDA and outputted by the audio element.

20 Claims, 7 Drawing Sheets

U.S. PATENT DOCUMENTS

| | | | |
|---|---|---|---|
| 5,392,287 A | 2/1995 | Tiedemann, Jr. et al. | |
| 5,457,814 A | 10/1995 | Myrskog et al. | |
| 5,497,507 A | 3/1996 | Komaki | |
| 5,566,357 A | 10/1996 | Holcman | |
| 5,570,025 A * | 10/1996 | Lauritsen et al. | 324/433 |
| 5,675,524 A * | 10/1997 | Bernard | 708/109 |
| 5,701,068 A | 12/1997 | Baer et al. | |
| 5,797,089 A | 8/1998 | Nguyen | |
| 5,821,736 A * | 10/1998 | Yeon | 320/148 |
| 5,948,040 A | 9/1999 | DeLorme et al. | |
| 6,029,074 A | 2/2000 | Irvin | |
| 6,034,621 A | 3/2000 | Kaufman | |
| 6,046,574 A | 4/2000 | Baranowski et al. | |
| 6,058,289 A | 5/2000 | Gardner et al. | |
| 6,094,034 A | 7/2000 | Matsuura | |
| 6,131,166 A | 10/2000 | Wong-Insley | |
| 6,184,654 B1 | 2/2001 | Bachner, III et al. | |
| 6,201,977 B1 | 3/2001 | Cathey et al. | |
| 6,233,464 B1 | 5/2001 | Chmaytelli | |
| 6,236,214 B1 | 5/2001 | Camp, Jr. et al. | |
| 6,289,228 B1 | 9/2001 | Rotstein et al. | |
| 6,314,308 B1 | 11/2001 | Sheynblat et al. | |
| 6,408,196 B2 | 6/2002 | Sheynblat et al. | |
| 6,434,403 B1 | 8/2002 | Ausems et al. | |
| 6,442,637 B1 | 8/2002 | Hawkins et al. | |
| 6,445,937 B1 | 9/2002 | daSilva | |
| 6,463,305 B1 | 10/2002 | Crane | |
| 6,516,202 B1 | 2/2003 | Hawkins et al. | |
| 6,535,749 B1 | 3/2003 | Iwata et al. | |
| 6,571,308 B1 | 5/2003 | Reiss et al. | |
| 6,615,405 B1 | 9/2003 | Goldman et al. | |
| 6,690,655 B1 | 2/2004 | Miner et al. | |
| 6,710,578 B1 | 3/2004 | Sklovsky | |
| 6,725,060 B1 | 4/2004 | Chhatriwala et al. | |
| 6,757,656 B1 * | 6/2004 | Gong et al. | 704/275 |
| 6,813,344 B1 | 11/2004 | Lemke | |
| 6,889,330 B2 | 5/2005 | Chauvel et al. | |
| 6,901,521 B2 | 5/2005 | Chauvel et al. | |
| 6,909,907 B1 | 6/2005 | Oyang et al. | |
| 6,943,667 B1 | 9/2005 | Kammer et al. | |
| 6,950,645 B1 | 9/2005 | Kammer et al. | |
| 6,999,791 B1 | 2/2006 | Ishikura et al. | |
| 7,035,620 B2 * | 4/2006 | Ben-Efraim et al. | 455/412.1 |
| 7,062,661 B1 | 6/2006 | Na | |
| 7,065,664 B2 | 6/2006 | Yang | |
| 7,092,506 B1 * | 8/2006 | Bers et al. | 379/265.02 |
| 7,254,415 B2 * | 8/2007 | Okamura | 455/556.1 |
| 7,260,390 B1 | 8/2007 | Skinner et al. | |
| 7,266,389 B2 | 9/2007 | Karaoguz et al. | |
| 7,278,032 B2 | 10/2007 | Chuang et al. | |
| 2001/0016918 A1 | 8/2001 | Alexander et al. | |
| 2001/0037420 A1 | 11/2001 | Sakamoto | |
| 2001/0041606 A1 | 11/2001 | Aoki et al. | |
| 2002/0032876 A1 * | 3/2002 | Okagaki et al. | 713/300 |
| 2002/0059481 A1 * | 5/2002 | Nunally | 710/5 |
| 2002/0103935 A1 | 8/2002 | Fishman et al. | |
| 2002/0127987 A1 | 9/2002 | Kent | |
| 2002/0173344 A1 | 11/2002 | Cupps et al. | |
| 2003/0084194 A1 | 5/2003 | Ryan | |
| 2003/0117117 A1 | 6/2003 | Zinn et al. | |
| 2003/0117316 A1 | 6/2003 | Tischer | |
| 2003/0158609 A1 | 8/2003 | Chiu | |
| 2008/0034233 A1 | 2/2008 | Chuang et al. | |
| 2010/0090662 A1 | 4/2010 | Okuto | |

FOREIGN PATENT DOCUMENTS

| | | |
|---|---|---|
| EP | 0591973 | 4/1994 |
| EP | 0892507 | 1/1999 |
| EP | 0926507 | 6/1999 |
| EP | 1164460 | 12/2001 |
| GB | 2235797 | 3/1991 |
| GB | 2294139 | 4/1996 |
| GB | 2335569 | 9/1999 |
| JP | 2001-313690 | 11/2001 |
| TW | 227053 | 7/1994 |
| TW | 239247 | 1/1995 |
| TW | 275733 | 5/1996 |
| TW | 345634 | 11/1998 |
| TW | 372291 | 10/1999 |
| TW | 387583 | 4/2000 |
| TW | 396305 | 7/2000 |
| TW | 432767 | 5/2001 |
| TW | 455780 | 9/2001 |
| TW | 468052 | 12/2001 |
| TW | 469744 | 12/2001 |
| TW | 475106 | 2/2002 |
| TW | 484048 | 4/2002 |
| TW | 499636 | 8/2002 |
| TW | 504913 | 10/2002 |
| TW | 517479 | 1/2003 |
| TW | 522626 | 3/2003 |
| TW | 522704 | 3/2003 |
| TW | 529271 | 4/2003 |
| TW | 535345 | 6/2003 |
| TW | 547712 | 8/2003 |
| WO | 97/09813 | 3/1997 |
| WO | 99/35557 | 7/1999 |
| WO | WO-0126340 | 4/2001 |
| WO | 01/39167 | 5/2001 |
| WO | 01/61872 | 8/2001 |

OTHER PUBLICATIONS

"2nd Office Action of European Counterpart Application No. 10150529.5", issued on Mar. 10, 2011, p. 1-p. 10.

"Power Supply Management IC and Li-Ion Battery Charge Control", TWL2213CA, Texas Instruments, p. 1-p. 31, Mar. 2001.

"Palm Handhelds to Receive GSM Data and Voice Connection With Realvision Snap-On", Sep. 22, 2000.

"FAQ for CarpeDiem V", Aug. 23, 2002.

"1st Office Action of US co-pending application" issued on Jul. 17, 2009, p. 1-p. 14.

"2nd Office Action of US co-pending Application" issued on Jan. 8, 2010, p. 1-p. 9.

"Search Report of European Counterpart Application" issued on Apr. 28, 2003, p. 1-p. 4.

"Office Action of European Counterpart Application" issued on Nov. 26, 2007, p. 1-p. 6.

"Office Action of European Counterpart Application" issued on Mar. 12, 2010, p. 1-p. 7.

"1st Office Action of Chinese Counterpart Application" issued on Feb. 22, 2008, p. 1-p. 11.

"Office Action of Japan Counterpart Application" issued on Nov. 4, 2005, p. 1-p. 7.

"Search Report of European Counterpart Application" issued on Apr. 15, 2010, p. 1-p. 4.

"Office Action of European Counterpart Application" issued on Apr. 29, 2010, p. 1-p. 7.

U.S. Appl. No. 60/403,224, filed Aug. 12, 2002, Jeyhan Karaoguz.

Eugene Shih et al., "Wake on Wireless: An Event Driven Energy Saving Strtegy for Battery Operated Devices", MOBICOM '02 (Sep. 23-26, 2002, Atlanta, GA), 721APPLE00392853-721APPLE00392864.

Lettieri et al., "Advances in Wireless Terminals", IEEE Personal Communications (Feb. 1999), 721APPLE00392161-721APPLE00392174.

Texas Instruments, Inc.: "TW Pat. App. No. L2213CA Power Supply Management IC and Li-Ion Battery Charge Control" Data Sheet (Mar. 2001), 721APPLE00392807-721APPLE00392837.

* cited by examiner

OPERATING METHOD FOR INTEGRATED INTERFACE OF PDA AND WIRELESS COMMUNICATION SYSTEM

CROSS-REFERENCE TO RELATED APPLICATION

This application is a continuation application of and claims the priority benefit of U.S. application Ser. No. 11/844,349, filed on Aug. 23, 2007, which is a continuation application of and claims the priority benefit of U.S. application Ser. No. 10/249,403, filed on Apr. 7, 2003, now U.S. Pat. No. 7,278,032. The prior application Ser. No. 10/249,403 claims the priority benefit of Taiwan application serial no. 91118369, filed on Aug. 15, 2002. The entirety of each of the above-mentioned patent applications is hereby incorporated by reference herein and made a part of this specification.

BACKGROUND OF THE INVENTION

1. Field of Invention

The present invention generally relates to a circuit and operating method for an integrated interface of a PDA and a wireless communication system, and more particularly, to a circuit, operating method for executing turn-on-device, power-saving, power-shortage determining, and power-charging for the integrated interface of a PDA and a wireless communication system.

2. Description of Related Art

In line with personal computer capability enhancement, the demands of portable computers increase accordingly and their functions are getting more and more mature. In the beginning, portable computer meant a lighter weight desktop computer that had to use household power supply. However, along with the development of LCD and the long-term battery, the notebook started to be accepted and used widely. The weight of a general notebook is about 2.5 kg to 3.5 kg. Therefore, the notebook indeed provides a perfect portability while keeping the complete functionality of a personal computer.

Since the notebook has acquired excellent performance in the market, many people have aggressively dedicated themselves to the development of a smaller computer. However, due to the limitation of display size and suitable input equipment, the development of the smaller computer had limited improvement. Nevertheless, finally there has been one smaller computer to breakthrough the difficulties mentioned above and be well accepted in the market. This is a computer that uses few buttons and a touch screen as input equipment, generally called the Personal Digital Assistant (PDA).

With PDA's high portability, plus the Optical Character Recognition (OCR) software, there is no much difference between a PDA and a general notebook in the convenience level of data input anymore. Therefore, the PDA is getting more and more popular in the market. The most common purpose of the general PDA is to provide the related information for daily living, such as calendar, railroad/bus time table, telephone numbers, and even domestic maps, etc. The general reason why a user uses a PDA is for its excellent portability, with which a user can get the information mentioned above to use a telephone at any time, any place. In order to contact with others at any time and any place, or to acquire the most updated and suitable information, a different sort of the wireless communication systems such as the Global System for Mobile (GSM) system or the General Packet Radio Service (GPRS) system are used to communicate with others, or through these wireless communication systems connecting to the Internet to acquire the most updated information. Either one of the above is a wonderful option.

However, PDA and all other wireless communication systems are sold independently in the current market. Therefore, besides purchasing a PDA and wireless communication systems, in order to connect to the Internet and acquire information easily, it is also necessary to purchase an appropriate network interface or use a more expensive infrared communication device to have mutual information exchange between a PDA and a wireless communication system. Therefore, users not only have to consider the compatibility between different products when they are purchased, but also have to carry all kinds of equipment for providing interfaces, which is really troublesome.

SUMMARY OF THE INVENTION

The present invention provides an operating method for an integrated interface of a PDA (Personal Digital Assistant) and a wireless communication system. The interface between the PDA and the wireless communication system is provided to integrate the PDA and the wireless communication system, and to further enhance the whole utilization between the PDA and the wireless communication system.

An operating method for an integrated interface of a PDA and a wireless communication system comprises the following steps. Firstly, when the wireless communication system starts to operate from a standby mode, a state signal is transmitted from the wireless communication system to the PDA. Then, if the PDA receives the state signal when the PDA is in a sleep state, the PDA is wakened and an input source of an audio element inside the PDA is switched to the wireless communication system. An electromagnetic wave signal is received by a wireless communication element and converted into audio data. Afterwards, the audio data is transmitted from the wireless communication system to the PDA and outputted by the audio element.

BRIEF DESCRIPTION OF THE DRAWINGS

The accompanying drawings are included to provide a further understanding of the invention, and are incorporated in and constitute a part of this specification. The drawings illustrate embodiments of the invention, and together with the description, serve to explain the principles of the invention.

DESCRIPTION OF THE PREFERRED EMBODIMENTS

Figure 1:
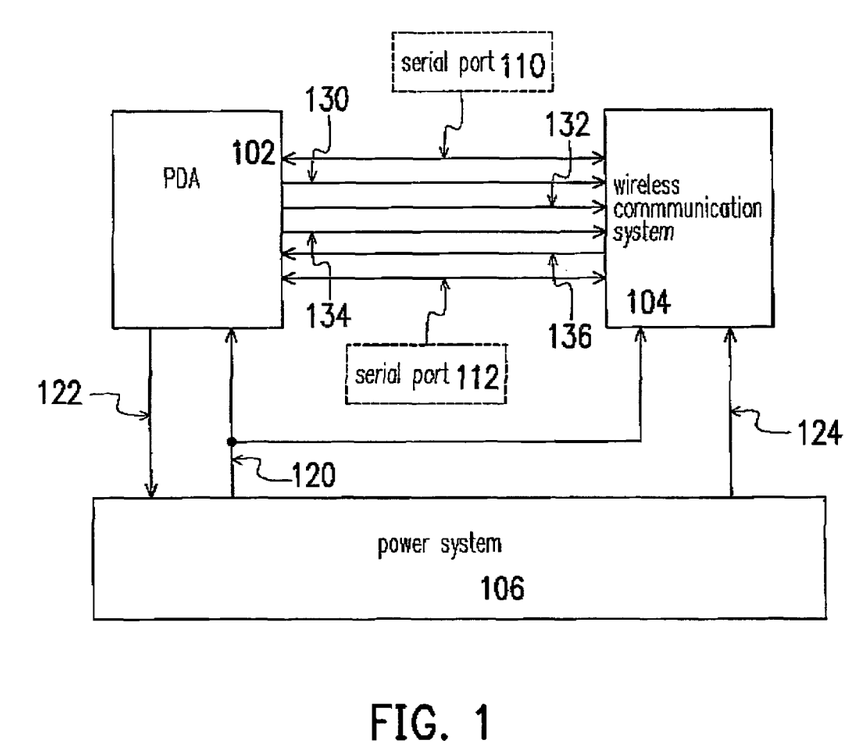
FIG. 1 schematically shows a block diagram for the integrated interface circuit of a preferred embodiment according to the present invention.

FIG. 1 schematically shows a block diagram for the integrated interface circuit of a preferred embodiment according to the present invention. The circuit for the integrated interface of the PDA (Personal Digital Assistant) and the wireless communication system shown in FIG. 1 transmits signal between the PDA 102 and the wireless communication system 104 to integrate and make them into a whole. In the present embodiment, the circuit for the integrated interface comprises a PDA-turn-on-wireless-communication-system signal line 130, a PDA-reset-wireless-communication-system signal line 132, a PDA-state signal line 134, a wireless-communication-system-state/wake-up-PDA signal line 136, two serial ports 110 and 112, and a power system 106. Wherein, the serial port 110 transmits the control signal and the status data of the wireless communication system state such as the antenna intensity and the battery capacity by using a multi-channel method, and the serial port 112 is dedicated to transmit the digital data signal. Under normal situations, the digital data signal transmitted between these two elements (usually, it is an audio signal) occupies a very long time period on the serial port. Therefore, the present invention transmits the control signal and the digital data signal via separate serial ports respectively to avoid prolonging the time for transmitting the control signal when the PDA 102 and the wireless communication system 104 transmit the digital data signal to each other. Moreover, the integrated interface does not interrupt the digital data transmission and does not impact the real timing of the digital data due to the requirement of transmitting the control signal.

Furthermore, although it is not shown in FIG. 1 precisely, the power system 106 used by the present embodiment supplies power to the PDA 102 and the wireless communication system 104 for their operation via related circuits, respectively. In addition, for the convenience of power management, the power system 106 of the present embodiment further provides a power-shortage signal to the PDA 102 and the wireless communication system 104 respectively via the signal line 120 when the power is insufficient. Moreover, the power system 106 further provides a charging signal to the wireless communication system 104 via the charging signal line 124. With the message provided by the charging signal, the wireless communication system 104 can determine the magnitude of the current and the charging circuit used for charging.

Moreover, in the present embodiment, in order to provide a further power management method, the PDA 102 transmits an idle signal to the power system 106 via the idle signal line 122 after it is idle for a certain period of time, so that the power system 106 can determine the magnitude of the power supplied to the PDA 102.

Figure 2:
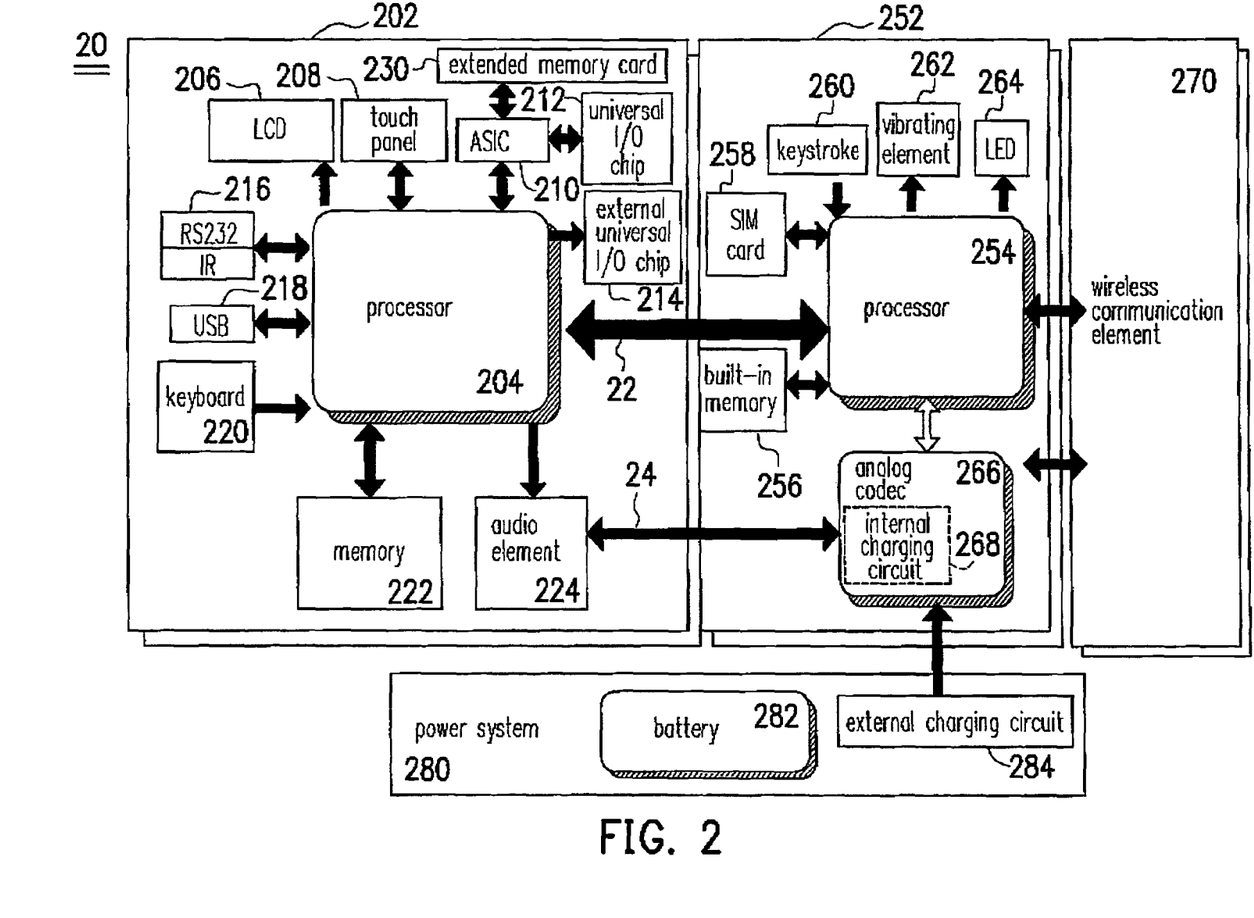
FIG. 2 schematically shows a block diagram for the integrated interface circuit of another preferred embodiment according to the present invention.

FIG. 2 schematically shows a detailed block diagram for the integrated interface circuit of another preferred embodiment according to the present invention. The device 20 comprises a PDA 202, a wireless communication system 252, a power system 280, and an integrated interface composed of a serial port 22 and a serial port 24. Wherein, the PDA 202 portion comprises a processor 204, an LCD (liquid crystal display) 206, a touch panel 208, an ASIC (Application Specific Integrated Circuit) 210, a universal I/O chip 212, an external universal I/O chip 214, an external device interface (RS232/IR) 216, a USB (Universal Serial Bus) 218, a keyboard 220, a memory 222, an audio element 224, and an extended memory card 230. The wireless communication system 225 portion comprises a processor 254, a built-in memory 256, a SIM card 258, a keyboard 260, a vibrating element 262, an LED 264, an analog Codec (coder/decoder) 266 with an internal charging circuit 268 included in it, and a wireless communication element 270 used for sending and receiving the electromagnetic wave signal. Moreover, the power system 280 used by the present embodiment is composed of the battery 282 and the external charging circuit 284. In addition, in the integrated interface used to communicate between the PDA 202 and the wireless communication system 252, the serial port 22 is used to transmit a control signal, and the serial port 24 is used to transmit a digital data signal. In order to have those skilled in the related art have better understanding of the technique contents of the present invention, the circuit block diagram shown in FIG. 2 is exemplified hereinafter to describe operating methods for the PDA and the wireless communication system provided by the present invention in detail. Furthermore, in order to reduce the complexity of drawings, the signal lines shown in FIG. 1, including the PDA-turn-on-wireless-communication-system signal line 130, the PDA-reset-wireless-communication-system signal line 132, the PDA-state signal line 134, and the wireless-communication-system-state/wake-up-PDA signal line 136 are not shown in FIG. 2. However, in order to achieve all specific functions, these signal lines are required under certain circumstances.

Figure 3:
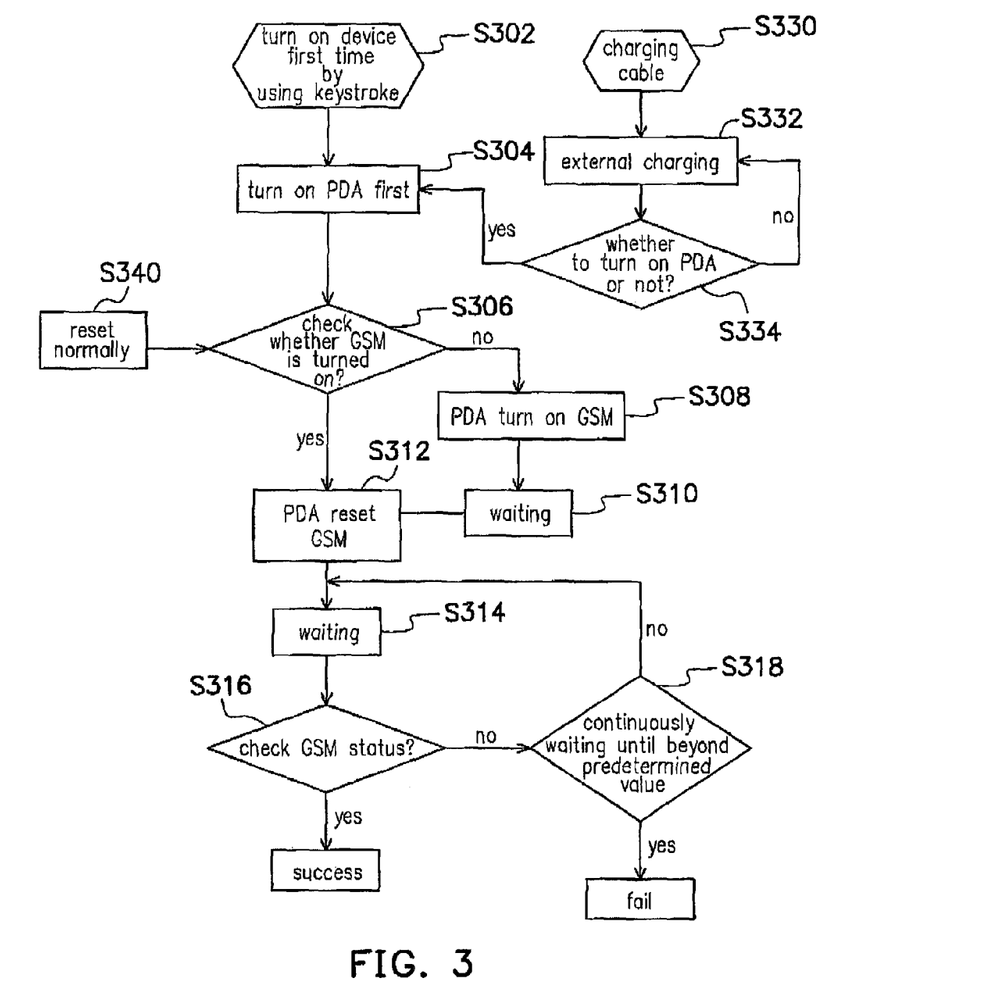
FIG. 3 schematically shows a step flow chart of a preferred embodiment that is included in the operating method for the integrated interface provided by the present invention related to the operation for turning on the system first time.

Referring to both FIG. 2 and FIG. 3 simultaneously, FIG. 3 schematically shows a step flow chart of a preferred embodiment that is included in the operating method for the integrated interface provided by the present invention and related to the operation for turning on the system first time. It has to be specified that the wording of the "turning on the system first time" used herein is switching the state of the PDA 202 from turn-off state to turn-on state. For example, the turn-on operation performed after the battery is exhausted or the PDA 202 is turned off to replace the battery belongs to the range of "turning on the system first time". Moreover, although the global system for mobile (GSM) is used as an example of the embodiment for the wireless communication system 252 in the present embodiment, it does not mean that the present invention is only suitable for the circumstance of the GSM combination, other wireless communication systems, such as the general packet radio service (GPRS) can also be applied with the same method.

In the embodiment as shown in FIG. 3, at first, for example, a keyboard is used by the user to turn on the device 20 for the first time after it is manufactured from the factory (step S302). Since the power system 280 currently used usually stores enough power for its operation, the system will turn on the PDA 202 first (step S304). Certainly, if the power system 280 does not store enough power to turn on the PDA 202, the device 20 cannot be turned on.

After the PDA 202 is turned on in step S304, the PDA 202 starts checking the status of the GSM 252 (step S306). Meanwhile, since the PDA 202 has been turned on, the processor 204 recognizes the status of the GSM 252 via the GSM-state/wake-up-PDA signal line 136. If the GSM 252 has been turned on, the PDA 202 transmits the PDA-reset-GSM signal to the processor 254 via the PDA-reset-GSM signal line 132 to reset the GSM 252 (step S312). Otherwise, if the GSM 252 is found to be turned off in step S306, the PDA 202 transmits the PDA-turn-on-GSM signal to the processor 254 via the PDA-turn-on-GSM signal line 130 to turn on the GSM 252

(step S308). After the GSM 252 has been turned on in step S308 and after waiting for a predetermined period of time (step S310), the PDA 202 performs the operation for resetting the GSM 252 as mentioned above (S312).

After the reset operation in step S312, the PDA 202 starts waiting for another predetermined period of time (step S314, and this predetermined period of time can be different from the waiting time in step S310 mentioned above). After waiting, the PDA 202 checks the status of the GSM 252 again (step S316). If the result of checking indicates the GSM 252 operates normally, the turn-on process is completed. Otherwise, if the result of checking indicates the GSM 252 does not operate normally yet (step S318), the steps S314-S316 are processed repeatedly to confirm the actual status of the GSM 252 under the circumstance that the waiting time does not exceed the length of the predetermined period of time. If the GSM 252 cannot operate normally even after waiting for the predetermined period of time, the device 20 issues an error message to notify the user that the GSM 252 turn on operation failed. In the present invention, the error message may comprise a flashing light, displaying a string on the PDA 202 or sounding a warning beep.

Although the embodiment mentioned above uses the circumstance that the device 20 is turned on the first time by the keyboard after it has been manufactured from the factory as a major foundation for description, all other methods for turning on the device that comply with the definition of "turning on device first time" can be used with the method mentioned above. For example, under the circumstance that the power of the power system 280 is completely exhausted and the device 20 has to rely on recharging via the external charging cable for resuming its operation, after the charging cable is plugged into the device 20 and starts charging the power system 280 (step S330), the power system 280 is charged gradually (step S332). Then, the device 20 tries to turn on the PDA 202 (step S334), and if the PDA 202 cannot be turned on yet, the device 20 charges the power system 280 continuously; if the power stored in the power system 280 is large enough to turn on the PDA 202, the process turns into the step S304 to turn on the PDA 202, and subsequently performs the turn-on-device operation mentioned above.

Moreover, the method provided by the present embodiment is also suitable for the general turn-on-device process after some minor modification. As shown in FIG. 3, after the PDA 202 passes the general normal reset operation (step S340), step S306 and its subsequent processes can be continued to complete the turn-on-device process.

It has to be specified herein, that when a system is charging, since there may be some leak of electricity between those two systems (PDA 202 and GSM 252), it may result in a certain unstable state, and thus the GSM 252 has to be reset after the PDA 202 is turned on to prevent the phenomenon of disorder from happening. Optionally, a switch can be designed in the power terminal of the GSM 252, and after the PDA 202 becomes stable, the PDA 202 turns on this switch to supply power to the GSM 252. Therefore, the GSM 252 is ensured not to be turned on before the main controller (i.e. PDA 202) and thus will not lose its control.

Figure 4:
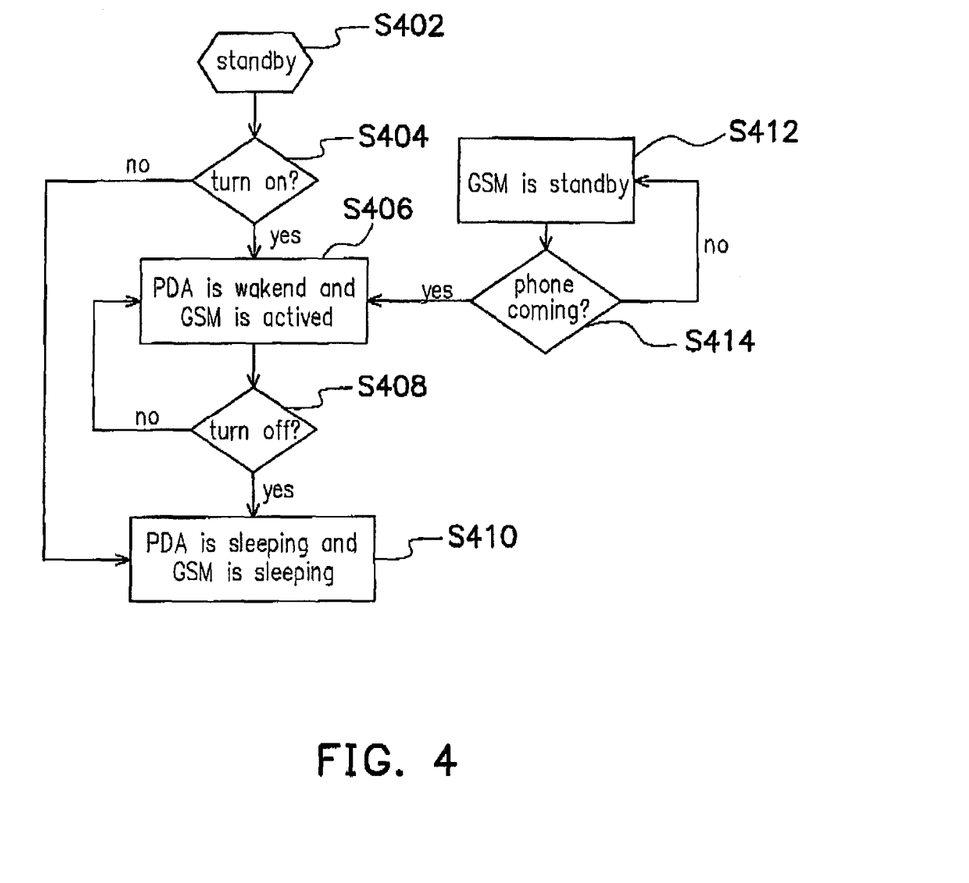
FIG. 4 schematically shows a step flow chart of the process included in the operating method for the integrated interface of a preferred embodiment according to the present invention related to the power-saving method.

FIG. 4 schematically shows a step flow chart of the process included in the operating method for the integrated interface of a preferred embodiment according to the present invention related to the power-saving method. The control process used for a general warm-turn-on-device is described herein first. Please also refer to FIG. 2 at the same time, when the PDA 202 is in the standby state (step S402), if the switch is not pressed yet, the PDA 202 keeps staying in the standby (sleep) state, and the GSM 252 enters into the sleep state (step S404-S410). If the switch is pressed while in the standby state, the PDA 202 will wake up, and the GSM 252 is activated simultaneously (step S404-S406). Afterwards, when the switch is pressed again (step S408), the PDA 202 will enter into the standby state, and the GSM 252 enters into the sleep state. When the GSM 252 is in the sleep state, the power system 280 does not provide the high frequency (e.g. 13 MHz) power to the GSM 252, saving power required for switching the state of the high frequency element under the standby state.

Referring to both FIG. 4 and FIG. 2 again, when the GSM 252 is in the standby state (it does not matter whether it is sleeping or not, i.e. step S412), the GSM 252 starts performing an operation for receiving a telephone signal for as long as it receives the telephone signal. Meanwhile, the GSM 252 transmits the GSM-state/wake-up-PDA signal to the processor 204 of the PDA 202 via the GSM-state/wake-up-PDA signal line 136 to wake up the PDA 202 first. After the PDA 202 is wakened, the input source of the audio element 224 is converted into the analog Codec 266 of the GSM 252. Therefore, the electromagnetic wave received by the wireless communication element 270 can be converted into the digital (or audio) data, and outputs it to the user via the analog Codec 266 by using the audio element 224. Moreover, if only the GSM 252 is used and there is no action applied to the PDA 202 for a certain period of time, the PDA 202 enters into the sleep state from the wake-up state to reduce the electricity wear.

In addition, there is still another method for saving the electricity wear. That is, as shown in FIG. 1, when the PDA 102 stays in the idle state, the PDA 102 provides an idle signal to the power system 106 via the idle signal line 122. The power system 106 changes to use a new method that saves more electricity to output power after it receives this idle signal, so as to save some electricity wear.

Figure 5:
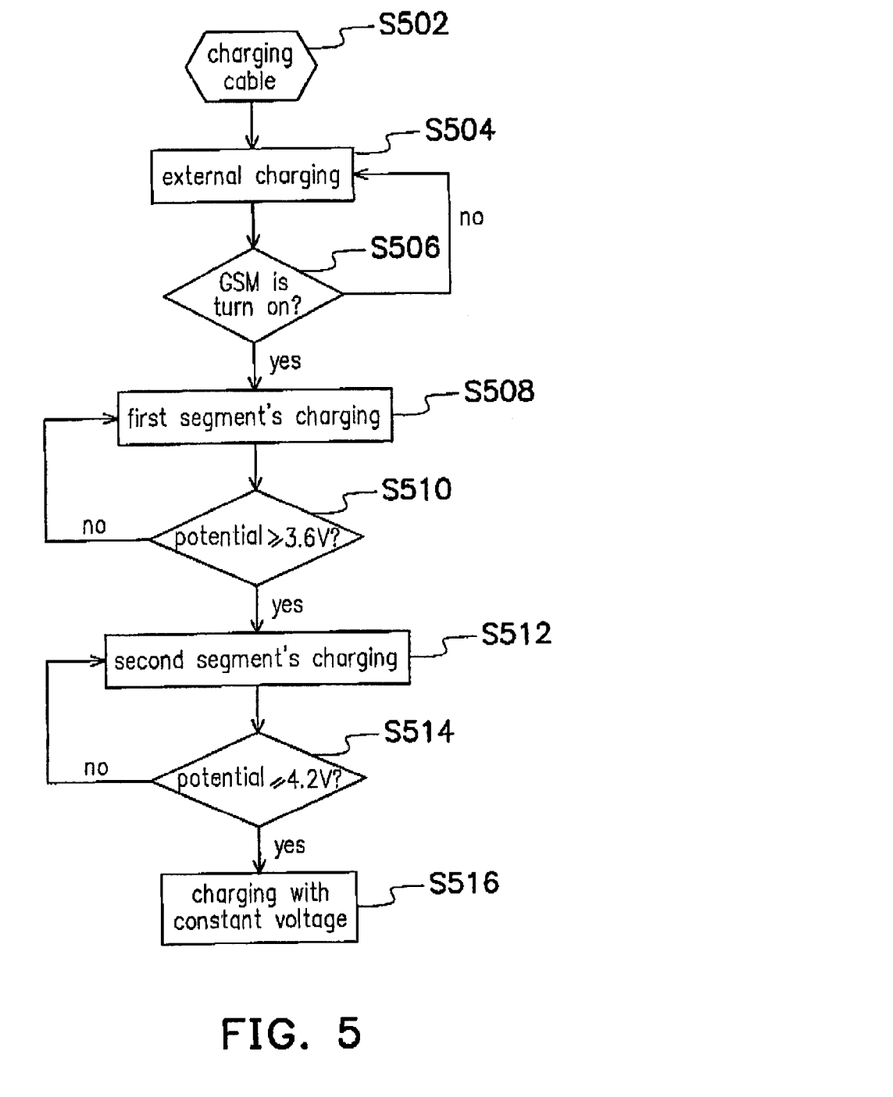
FIG. 5 schematically shows a flow chart of the steps included in the operating method for the integrated interface of a preferred embodiment according to the present invention related to power charging.

FIG. 5 schematically shows a flow chart of the steps included in a preferred embodiment according to the present invention and related to the power charging. In order to have a better understanding, please also refer to FIG. 2 at the same time. When the charging cable is plugged into the power system 280 and starts charging (step S502), the external charging circuit 284 inside the power system 280 starts charging to the battery 282 with a small-current charging method (step S504). Meanwhile, the power system 280 sends a charging signal to the GSM 252 to notify it that it is in the charging state now. After the small-current charging is started, the device 20 starts trying to turn on the GSM 252. If the GSM 252 cannot be turned on, the small-current charging is continuously performed; otherwise, if the GSM 252 is turned on successfully, the process enters into next step's charging process (step S506). After the GSM 252 is turned on successfully, the internal charging circuit 268 inside the GSM 252 starts to operate, and with this, it performs faster speed's charging to the battery 282. For example, when the potential of the battery 282 is lower than 3.6 V, the internal charging circuit 268 uses 600 mA as the current value for the first segment's charging (step S508, S510). When the potential of the battery 282 is in between 3.6 V and 4.2 V, the internal charging circuit 268 uses 900 mA as the current value for the second segment's charging (step S512, S514). After the potential of the battery 282 achieves 4.2 V, the internal charging circuit 268 changes to use the constant-voltage charging method to charge the battery 282 (step S516), so that the battery 282 is not damaged due to over-charging.

Figure 6A:
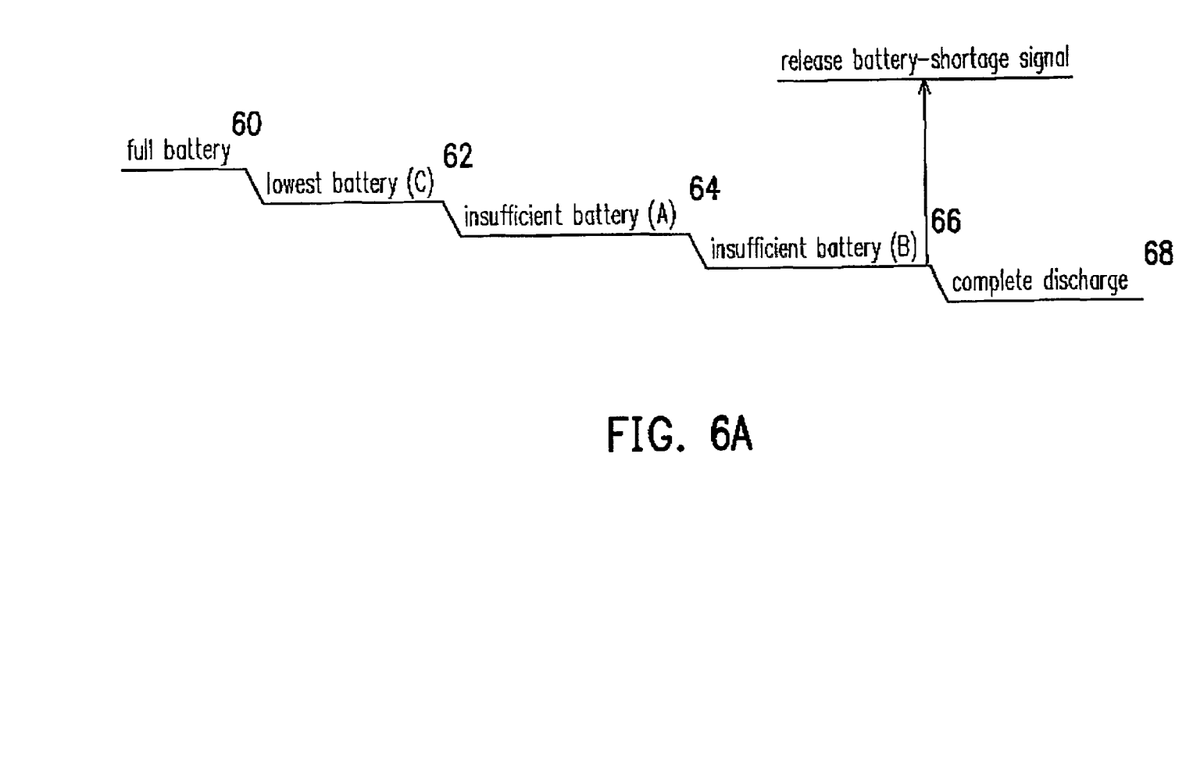
FIG. 6A schematically shows a sketch map of the potential levels used by a preferred embodiment according to the present invention.
Figure 6B:
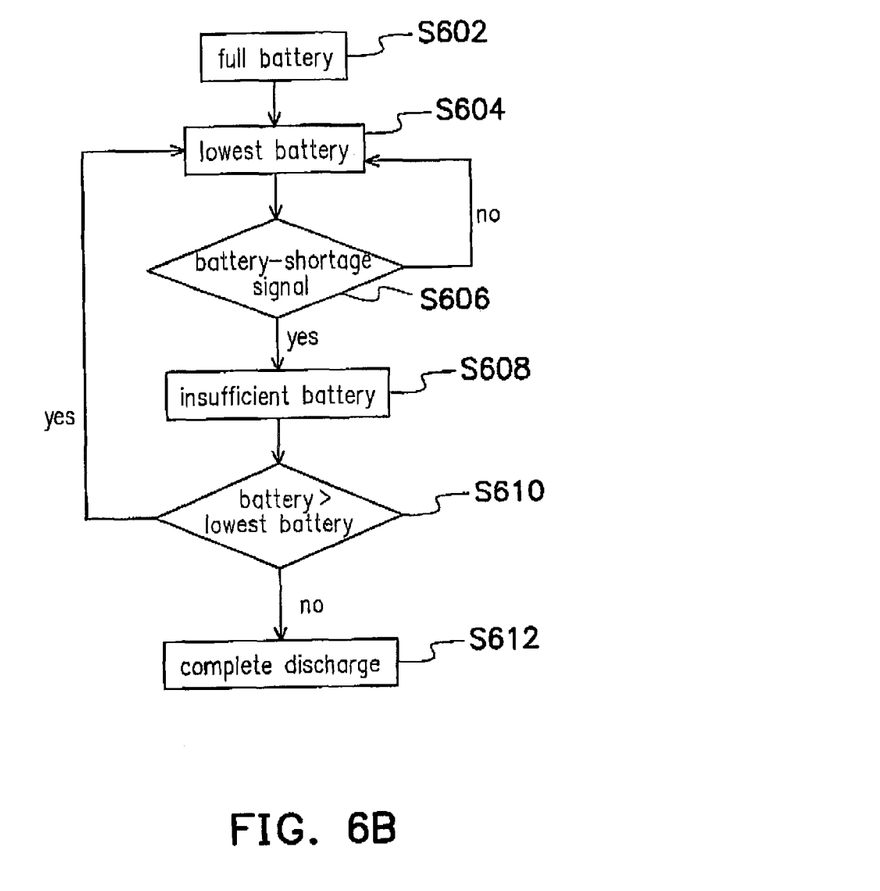
FIG. 6B schematically shows a flow chart of the steps included in the operating method for the integrated interface of a preferred embodiment according to the present invention related to the power-shortage determining method.

FIGS. 6A and 6B schematically shows a sketch map of the potential levels and a step flow chart used by a preferred embodiment according to the present invention, respectively.

In FIG. 6A, the present invention divides the battery potential into five different levels, they are: full battery 60, low battery (C) 62, insufficient battery (A) 64, insufficient battery (B) 66, and complete discharge 68, respectively. In an embodiment of the present invention, the potential represented by these levels is: full battery 60 indicates the current battery potential is above 3.8 V, low battery (C) 62 indicates the current battery potential is in 3.8V~3.6 V, insufficient battery (A) 64 indicates the current battery potential is in 3.6V~3.5 V, insufficient battery (B) 66 indicates the current battery potential is in 3.5V~3.2 V, and complete discharge indicates the current battery potential is below 3.2V, respectively. Certainly, the dividing standard for the battery potential levels does not have to match the present embodiment, those skilled in the related art can appropriately adjust the dividing standard, the figures listed above are only exemplified herein and do not serve as the necessary limitation condition for the present invention.

The power-shortage determining method provided by the present invention is further described in detail hereinafter. In order to have a better understanding and facilitate the explanation, please refer to both FIG. 6A and FIG. 6B at the same time. In FIG. 6B, it is assumed that the battery 282 is in the full battery 60 state at first (step S602), meanwhile all operations for the device 20 operate normally. After the device 20 continuously uses power and makes the potential of the battery 282 fall in the range of the lowest battery (C) 62 (step S604), the power system 280 determines whether to issue the battery-shortage signal or not (step S606).

The standard used in step 606 for determining whether to issue the battery-shortage signal or not is further described hereinafter. It is assumed that the battery 282 is in low battery (C) 62, and the devices 20 are heavy loaded, such as the state when the PDA 202 is using the audio element 224 or the GSM 252 is using telephone. Since it uses more current, the potential of the battery 282 easily falls into the range of insufficient battery (B) 66 immediately. Therefore, after the potential of the battery 282 enters into the range of the low battery (C) 62, if the device 20 turns to heavy loading from light loading (e.g. sleep mode) suddenly, the power system 280 issues the battery-shortage signal when the potential of the battery 282 is lower than the insufficient battery (B) 66. If the device 20 keeps staying in the light loading, the power system 280 issues the battery-shortage signal when the potential of the battery 282 is lower than the insufficient battery (A) 64. In other words, the criteria for generating the battery-shortage signal can be adjusted automatically depending on conditions.

If after step S606, it is determined not to issue the battery-shortage signal, the battery 282 stays in the low battery state and does not enter into the insufficient battery state; if it is determined to issue the battery-shortage signal, the power system 280 provides the battery-shortage signal to the PDA 202 and GSM 252, respectively. This indicates the battery 282 has entered into the level of insufficient battery already (step S608). To be noted, the current battery potential may fall into the level of either insufficient battery (A) 64 or insufficient battery (B) 66. Once the power system 280 issues the battery-shortage signal, the battery-shortage signal is not released until the potential of the battery 282 is higher than that of the low battery (C) 62. If the user continuously uses it, after the potential of the battery 282 is lower than insufficient battery (B) 66, the power system 280 enters into the level of complete discharge and is not allowed to execute any operation.

To be specified herein, since the sudden fall of the battery voltage is commonly generated when it is changed from light loading to heavy loading, the electrical energy actually stored in the battery may still be big enough to support the power that is required for normal operation. Therefore, the battery-shortage determining method provided by the present invention can avoid the condition of abnormal device turn-on and turn-off resulting from the system not recognizing the battery-shortage due to the light loading to heavy loading change by flexibly adjusting the criteria for determining battery-shortage.

In summary, the advantages of the present invention are described hereinafter. The present invention transmits control signals and digital data respectively by using two serial ports, thus to simplify the communication protocol generally considered and used to transmit control signals and digital data simultaneously by using a single serial port. Moreover, not only is the hardware cost much less than the cost needed for infrared system or bluetooth system, but also provides an efficient method for managing power, so that power waste can be eliminated.

Although the invention has been described with reference to a particular embodiment thereof, it will be apparent to one of the ordinary skill in the art that modifications to the described embodiment may be made without departing from the spirit of the invention. Accordingly, the scope of the invention will be defined by the attached claims not by the above detailed description.

What is claimed is:

1. An operating method for a device having a PDA and a wireless communication system integrated into a whole in the device, comprising:
   transmitting a wake-up signal from the wireless communication system to the PDA when the wireless communication system starts to operate from a standby mode;
   waking the PDA up from a sleep state when the wake-up signal is received by the PDA;
   receiving an electromagnetic wave signal by a wireless communication element;
   converting the electromagnetic wave signal into an audio data;
   transmitting the audio data from the wireless communication system to an audio element inside the PDA via a serial port connected between the wireless communication system and the PDA;
   outputting the audio data by the audio element; and
   when the PDA is turned on, performing the steps:
      turning on the PDA;
      turning on the wireless communication system by the PDA; and
      resetting the wireless communication system after turning on the wireless communication system.

2. The operating method of claim 1, further comprising:
   switching the PDA to the sleep state when the wireless communication system continuously operates and the PDA does not operate for a certain period of time.

3. The operating method of claim 1, further comprising:
   using another serial port to transmit a control signal between the PDA and the wireless communication system.

4. The operating method of claim 1, further comprising:
   when the PDA is turned on, further performing the steps:
      checking a status of the wireless communication system;
      completing the steps of turning on the PDA and the wireless communication system if the status of the wireless communication system is normal; and
      displaying an error message to indicate that turning on the wireless communication system is in failure if the status of the wireless communication system is abnormal.

5. The operating method of claim 1, wherein the step of resetting the wireless communication system comprises:
transmitting a PDA-reset-wireless-communication-system signal from the PDA to the wireless communication system via a PDA-reset-wireless-communication-system signal line.

6. The operating method of claim 1, wherein the steps of turning on the wireless communication system and resetting the wireless communication system comprises:
transmitting a PDA-turn-on-wireless-communication-system signal from the PDA to the wireless communication system via a PDA-turn-on-wireless-communication-system signal line;
waiting for a predetermined period of time; and
transmitting a PDA-reset-wireless-communication-system signal from the PDA to the wireless communication system via a PDA-reset-wireless-communication-system signal line.

7. The operating method of claim 4, wherein the step of displaying the error message comprises displaying a flashing light.

8. The operating method of claim 4, wherein the step of displaying the error message comprises displaying a displaying string on the PDA.

9. The operating method of claim 4, wherein the step of displaying the error message comprises sounding a beep.

10. The operating method of claim 1, further comprising:
providing a power-shortage signal to the PDA when a power is insufficient.

11. The operating method of claim 10, wherein the power is provided from a battery, and a battery potential of the battery is divided into a first potential, a second potential, and a third potential from high to low, wherein the step of providing the power-shortage signal to the PDA comprises:
issuing the power-shortage signal when the battery potential is lower than the second potential;
after issuing the power-shortage signal, if the battery potential is greater than or equal to the first potential, stopping issuing the power-shortage signal;
when the battery potential is between the first potential and the second potential and the power-shortage signal is not provided, keeping normal operation; and
when the battery potential is lower than the third potential, completely discharging the battery.

12. The operating method of claim 1, further comprising:
providing a charging signal to the wireless communication system from a power system of a circuit for the integrated interface; and
determining a charging mode by the wireless communication system, according to a potential of the power system.

13. The operating method of claim 1, further comprising:
switching an input source of the audio element inside the PDA to the wireless communication system when the wake-up signal is received by the PDA.

14. The operating method of claim 1, further comprising:
checking a status of the wireless communication system; and
completing the steps of turning on the PDA and the wireless communication system if the status of the wireless communication system is normal.

15. The operating method of claim 14, further comprising:
displaying an error message to indicate that turning on the wireless communication system is in failure if the status of the wireless communication system is abnormal.

16. A device comprising:
a wireless communication system for receiving an electromagnetic wave signal and converting the electromagnetic wave signal into an audio data;
a PDA having a processor and an audio element connected to the processor, wherein the wireless communication system and the PDA are integrated into a whole in the device;
a serial port connected between the wireless communication system and the PDA, wherein the audio data is transmitted from the wireless communication system to the audio element of the PDA via the serial port and outputted by the audio element;
a wake-up signal line connected between the PDA and the wireless communication system, wherein the wake-up signal line is used for transmitting a wake-up signal from the wireless communication system to the PDA to wake the PDA up from a sleep state when the wireless communication system starts to operate from a standby mode; and
a PDA-turn-on-wireless-communication-system signal line connected between the wireless communication system and the PDA for transmitting a PDA-turn-on-wireless-communication-system signal from the PDA to the wireless communication system to turn on the wireless communication system.

17. The device of claim 16, wherein an input source of the audio element is switched to the wireless communication system when the PDA receives the wake-up signal.

18. The device of claim 16, wherein the PDA is switched to the sleep state when the wireless communication system continuously operates and the PDA does not operate for a certain period of time.

19. The device of claim 16, further comprising:
another serial port connected between the wireless communication system and the PDA for transmitting a control signal between the PDA and the wireless communication system.

20. The device of claim 16, further comprising:
a PDA-reset-wireless-communication-system signal line connected between the wireless communication system and the PDA for transmitting a PDA-reset-wireless-communication-system signal from the PDA to the wireless communication system to reset the wireless communication system.

* * * * *